UNITED STATES PATENT OFFICE 2,440,907

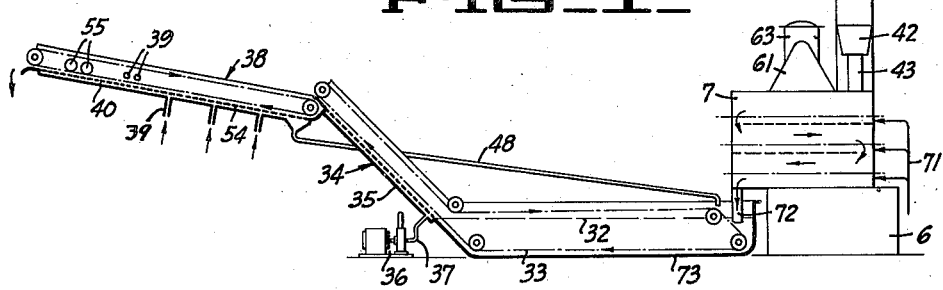

TREATMENT OF POMACE

Ernest Kurt Metzner, Los Angeles, Calif.

Application October 22, 1945, Serial No. 623,844

2 Claims. (Cl. 260—527)

This invention relates to treatment of the solid material, usually termed pomace, remaining after crushing and fermentation of grapes to the end that certain valuable constituents present can be recovered and the residue is useful as a fertilizer or feed. The invention will be described as it has been successfully practised on wine grapes and the resulting pomace. It is applicable, however, to the treatment of those residues similar to pomace and which result from practice of fermentation to produce ethyl alcohol from various fruits and vegetables and berries and other fermentable substances.

In the manufacture of wines, the grapes are first subject to a mechanical operation in which the grapes are stripped and separated from the large stems and crushed. Depending upon the type of wine desired, the juice is immediately separated from the solids present or else the mixture of juice, skins, pulp and seeds is permitted to ferment until a desired quantity of the grape sugar present has been converted into alcohol, whereupon the liquid present is separated from the solids. In either case, the solids separated from the juice contain the same concentration of alcohol as the liquid from which they were separated. Heretofore these solids, usually termed "pomace," have been discarded or have been washed or soaked with water, usually as an incident to their removal from the fermentation vessel, and thereafter pressed free of liquids. It has been a belief commonly held by many in the industry that this operation sufficed to remove from the pomace all of the alcohol present, the wash water being collected and distilled to recover the alcohol. These operations, I have found, did not suffice to remove all the alcohol present which was discarded with the pomace. I have found between 1½% to 8% of alcohol present in supposedly alcohol free pomace discarded as a waste. This is understandable for the pomace is a hard, packed mass of skins, seeds, stems and pulp containing a relatively low alcohol content.

I have found that by continuously working the pomace mass so as to loosen it and render it vapor permeable and by heating the pomace to raise the temperature to a point whereat the alcohol vaporizes readily, the alcohol is vaporized and swept out of the mass by the gases formed during the heating or by injecting steam or other hot gas into the mass. To practice this process, I have provided a novel apparatus in which the pomace is preferably worked by screw conveyor flights which keep the mass loose and vapor permeable.

I have also discovered that if the pomace remaining after the fermentation operation is heated under such conditions that, in effect, cooking of the material is secured and the alcohol value completely eliminated, and recovered, the tartrate value can be recovered to a greater extent, while the nitrogen containing compounds present in the pomace are so altered that upon a subsequent, mild acid hydrolysis, these are available and provide valuable constituents in the final solid material recovered. Mere washing of the pomace with hot water does not suffice to effect the cooking for it is necessary to raise the pomace to a temperature and for a time sufficient to evaporate completely the alcohol present. The temperature employed should be at least that of the boiling point of water at the pressure of operation to ensure complete evaporation. During the cook, a mild acid hydrolysis occurs for the pomace is of an acid nature and water is present. Upon subsequent addition of the cooked material to water, the acid constituents present in the alcohol free pomace are sufficient to raise the pH of the water to between pH 2.8 and pH 3.8. If the material is maintained in contact with this acid water for a period of from one to thirty minutes, and preferably of the order of twenty minutes, further mild hydrolysis follows. At the same time, the water soluble potassium tartrate present is dissolved and, upon subsequent separation of the liquid and the solids present, the tartrates can be recovered from the liquor. The solids remaining, due to their processing, readily decompose. When decomposed, the mass contains a high available nitrogen content. It is of a humus like nature so that, if added to the soil, it quickly liberates its nitrogen to plants. The solids can be added directly to the soil, decomposing readily. The solids are acid free and can be added to the soil without endangering plant life, decomposing there to liberate their nitrogen.

The invention is preferably practised in a continuous manner upon the pomace. It is not necessary to maintain separate the pomace derived from different types of grapes and other tartrate and alcohol containing materials such as lees and filter cake can be added to the pomace undergoing treatment or handled separately in accordance with this invention.

The practice of the invention, its advantages and the advance provided will become further apparent upon considering the following examples set forth by way of illustration:

The present preferred form of apparatus for practicing the process of the invention is disclosed in the drawings accompanying and forming a part hereof.

Figure 1 is a diagrammatic representation of apparatus which I have used successfully and a flow sheet.

Figure 2 is a side elevation, partly in section, illustrating the construction of the apparatus.

Figure 3 is an end view of the apparatus shown in Figure 2.

Figure 4 is an enlarged cross section showing the pair of conveyor flights, the pomace supporting shelf, the steam discharge pipe and, diagrammatically, the manner in which the cooperating screw conveyor flights work the pomace mass.

Referring to the drawings, I provide a suitable base or support 6 on which is mounted the alcohol vapor extraction vessel 7. Positioned transversely of vessel 7 are several pomace supporting shelves 8, 9 and 10. As appears in Figure 3, each pomace support shelf is arcuately formed along each longitudinal side 11 to fit the adjacent portion of the parallel screw conveyor flights 12 and 13 which extend along each shelf. Screw conveyor flights 12 and 13 are each mounted upon a shaft 14 and on a shaft 15. Shelf 8 extends from the right hand side of vessel 7 (Figure 2) across the vessel, terminating short of the other end of the vessel so that the material advanced along the shelf by the conveyor flights falls off the end of the shelf and onto the immediately adjacent but lower conveyor flights and their cooperative shelf 9. Shelf 10, in turn, extends from the left hand side of vessel 7 (Figure 2) toward the other side of the vessel so that the material transported thereover by the conveyor flights is discharged on to the pair of immediately adjacent but lower conveyor flights positioned just above shelf 10. This construction enables the length of vessel 7 to be reduced as compared to the length required if a single shelf was employed with a single pair of flights. In addition, the pomace falling on to another pair of conveyor flights works the pomace additionally and enables it to be further loosened.

Shafts 14 and 15 for each conveyor flight are supported in suitable bearings carried in the end walls of vessel 7. Mounted upon the left hand end of each of these shafts are cooperating and inter-engaged gears 16 (Figure 2). The several flights are driven in a timed relation by motor 17 mounted upon an extension 18 on support 6. A chain 21 is trained about a sprocket 19 on the motor shaft and about a sprocket 22 on shaft 14 in the lowermost conveyor flight. Because of the inter-engagement of the gears on the other end of shafts 14 and 15, the cooperatively adjacent flight is driven in a timed relationship. A sprocket 23 on shaft 14 drives a chain 24 provided about sprocket 26 on the next immediately adjacent shaft 14 while sprocket 28 on shaft 15 in the intermediate flight drives chain 29 and, in turn, sprocket 31 on uppermost shaft 15. In this way, several flights are driven with a single motor and in a timed relationship and the pomace moves continuously through the vessel 7 at a desired rate.

Means are provided for discharging pomace to be treated into vessel 7. To effect this a superstructure or frame 41 is mounted upon an upper portion of the vessel 7 to support a hopper 42 and a pipe 43 which extends downwardly from the hopper into the vessel 7. A screw conveyor flight 44 is positioned in pipe 43, terminating above the end of the pipe so that a solid plug of pomace fills and seals the ends of the pipe. The screw flight, which can be vertical or horizontal, is mounted upon a shaft 46 supported in suitable bearings 47 in the frame. A mitre gear 49 is mounted upon shaft 46 and is driven by a mitre gear 51 on shaft 52 of motor 53.

To close discharge pipe 43 and prevent vapors from passing out through this pipe when pomace is not being discharged, a shaft 56 is mounted transversely of vessel 7. On that end of the shaft which projects from the vessel, an arm 57 is mounted carrying a weight 58. Within the vessel, a door 59 is mounted on shaft 56 to extend across pipe 43. Material forced through the pipe 43 by the screw conveyor 44 moves the door out of the way so that the material is free to fall down upon the immediately adjacent screw conveyor flights. When material is not being discharged, weight 58 is effective to swing the door into sealing position across the end of the pipe 43.

To remove vapors, vapor chest 61 is provided on the upper portion of the vessel and is connected by a pipe 62 to an alcohol-water condenser 63 through which a suitable heat exchange coolant is passed in a heat exchange relationship. Vent 64 is provided on the side of the condenser. The condensed aqueous alcohol solution is drawn off through pipe 66 into an alcohol receiving tank 67 for further processing or concentration.

Between each screw conveyor flight 12 and 13 is provided a pipe 71; there are three pipes, one for each set of flights. Each is connected to a common header and by means of this to a supply of steam or other hot gas. Each pipe has a plurality of jet-like openings 74 along the pipe to release the hot gas or steam into the pomace. With pomace discharged substantially continuously from hopper 42, the compact fibrous mass of seed, stems, skin and pulp is broken and loosened by the continuous working between the supporting shelf and the several pipes. In Figure 4 I have shown this diagrammatically; the two conveyor flights throw the pomace toward the middle of the shelf and build up a loose mass of material into which the hot fluid is released in jet form to assist in breaking up the mass and vaporizing the alcohol by heating the pomace to facilitate vaporization and, because of the volume of steam, sweeping out of the pomace any alcohol vapors arising from the pomace so that by the time pomace reaches discharge pipe 72 it is substantially free of alcohol. The pomace discharged through pipe 72 is admitted to a tank 73 for tartrate extraction according to my aforementioned process as described particularly in connection with Figure 1.

Pipe 72 extends below the level of liquid in tank 73 and the pipe is thus sealed against vapor loss.

It is a feature of this invention that pomace can be processed for its alcohol content without any prior grinding or other comminution operation. So long as the pomace can be fed into the screw 43 it can be de-alcoholized.

The substantially alcohol-free pomace passes downwardly through pipe 72 from the chamber 7. The end of pipe 72 is normally beneath the liquid level 32 in a trough 73 so that vapor escaping from the closed chamber is prevented. Trough 73 extends horizontally and is relatively deep so that pomace therein is subject to adequate contact with a suitable heated treatment solution. A suitable conveyor 33 is provided in the trough to move the pomace therein continuously through the trough and the solution therein. While this conveyor can take various forms, I have conveniently used a cleat conveyor. At the end of the trough opposite to the pomace inlet I provide an incline section generally indicated at 34. The cleat conveyor is adapted to move up this incline so that the treatment solution drains from the pomace. The liquid in the trough is preferably heated as by suitable steam jets (not shown). In addition, baffles (not shown) are placed in the trough to assure that the pomace remains in the trough for a sufficient length of time.

The incline portion 34 has a false screen bottom indicated at 35 over which the pomace is moved by the cleats of the conveyor which keep the screen open and the liquid drains freely. A pump indicated generally at 36 is provided. This pump has an inlet indicated at 37 placed at a suitable elevation on the trough, the pump drawing off excess treating solution adjacent the point of connection of the inclined portion 34.

A second cleat conveyor indicated at 38 is provided, this conveyor being placed in a position to receive the drained pomace discharged from conveyor 33 and move it along over a screen 40. A plurality of water sprays indicated at 39 are positioned to spray the drained pomace and to remove any tartrate solution adhering thereto. The washing conveyor 38 has a drain trough 54 below screw 40; a pipe 48 connected therewith drains the washwater into the trough 73 at the pomace inlet end. Adjacent the end of conveyor 38 several pressing rolls 55 are provided to remove excess liquid in the pomace. The pomace leaving the conveyor 38 is useful as a feeder fertilizer for it is well established, free of alcohol, while the materials providing excess acidity therein, which made it objectionable as a feed and injurious as a fertilizer, have been removed.

The untreated pomace is preferably treated with a relatively dilute treatment solution, one lean in tartrates, as this hastens tartrate solution. The solution rate of the tartrates is relatively low; its concentration in the treatment solution is always relatively low in trough 73. By operating in the manner indicated, good recoveries are achieved.

The solution removed from the extraction trough can be used for the production of any desired tartrate material. The treatment solution itself can be of any desired composition. I have successfully used water containing a small amount of hydrochloric acid, but any other suitable leaching solution or a solvent can be employed instead. The solution is preferably heated to hasten extraction, a temperature between 90°–200° F. usually sufficing.

As typical of an operation conducted in accordance with my invention, ten tons of pomace per hour were fed into vessel 7 in which the mass of cold solid packed pomace was continuously agitated and heated to break up the pomace and to raise it uniformly to a temperature of 214° F. Steam pipe 71 discharged directly between the two screws 12 and 13, the steam being jetted into the mass of pomace worked by the screws. I have successfully used steam under a pressure of 50–75 pounds gauge. The steam was introduced at the rate of 3,300 pounds per hour.

The vapors arising from the cooking operation were taken off, collected and cooled to provide a weak alcohol solution, the equivalent of 250 gallons of 50% ethyl alcohol being collected per hour. The pomace was subject to the cooking operation for about ten minutes, a period sufficient to effect such heat alteration in the cellulose, albuminoid and other nitrogen containing constituents present that the mild acid hydrolysis taking place during cooking and later was effective to alter their characteristics, as will subsequently appear. After the cooking operation, the pomace remaining was introduced into trough 73 in which the material was steeped and agitated. The acid constituents of the pomace were such as to raise the pH of the water to 3.0. The water was introduced at the rate of 2,500 gallons per hour and a like water quantity was drawn off, that removed by pump 36 containing 1½% by weight of potassium bitartrate.

As I have said, it is immaterial as to what type of grape is utilized initially or the degree of fermentation effected. Also, the recovery operation can be practiced even though the pomace has been previously washed with water and subsequently pressed to remove residual alcohol containing wash liquor.

The term pomace or "fruit pomace" has been used herein and in the claims in a broad sense as applying not only to the usual grape pomace but to other materials such as lees or pomace derived from suitable fruits other than grapes— as apples.

This is a continuation in part of application Serial No. 621,612, filed October 10, 1945, now abandoned.

I claim:

1. A process for recovering valuable constituents from a fruit pomace of an acid nature and containing ethyl alcohol comprising heating the pomace to a temperature of substantially the boiling point of water for about 10 minutes while continuously agitating the pomace to drive off ethyl alcohol present in the pomace and cook the pomace, soaking the cooked pomace in water for about twenty minutes to dissolve acidic components present in the pomace and effect an acid hydrolysis of at least some of the nitrogen containing bodies present and to extract water soluble tartrates present, separating the solids remaining from the water, and recovering the tartrates from the water.

2. A process for recovering valuable constituents from a fruit pomace of an acid nature and containing ethyl alcohol and comprising passing steam through a continuously agitated mass of pomace for about ten minutes to heat the mass to at least 212° F. and drive off ethyl alcohol and effect heat alteration of the pomace, soaking the pomace in water to dissolve (a) water soluble tartrates present in the heat altered pomace and (b) acidic components present in the heat altered pomace to acidify the water, maintaining the pomace in the water for about twenty minutes to effect hydrolysis of pomace constituents and release further tartrate values into solution, separating the solids remaining from the water, and recovering the tartrate values in the water.

ERNEST KURT METZNER.

REFERENCES CITED

The following references are of record in the file of this patent:

UNITED STATES PATENTS

| Number | Name | Date |
| --- | --- | --- |
| 627,026 | Viele | June 13, 1899 |
| 780,976 | Ciapetti | Jan. 31, 1905 |
| 783,524 | Hooven et al. | Feb. 28, 1905 |
| 2,260,111 | Caldwell | Oct. 21, 1941 |
| 2,359,929 | Metzner | Oct. 10, 1944 |

OTHER REFERENCES

Brannt, "Vinegar, etc." (Baird & Co., Phila.), pages 247–249 (1890).